United States Patent [19]

Brooke

[11] Patent Number: 4,780,119

[45] Date of Patent: Oct. 25, 1988

[54] METHOD AND APPARATUS FOR PRODUCING CARBON DIOXIDE UNITS

[75] Inventor: Robert K. Brooke, Snellville, Ga.

[73] Assignee: TOMCO2 Equipment Company, Loganville, Ga.

[21] Appl. No.: 103,724

[22] Filed: Oct. 2, 1987

[51] Int. Cl.⁴ ............................................. F25J 5/00
[52] U.S. Cl. ........................................ 62/12; 62/35; 62/341
[58] Field of Search ...................... 62/12, 35, 74, 341

[56] References Cited

U.S. PATENT DOCUMENTS

| | | | |
|---|---|---|---|
| 2,151,855 | 3/1939 | Kobold | 62/35 |
| 2,282,460 | 5/1942 | Dickey | 62/35 |
| 3,576,112 | 4/1971 | Frost et al. | 62/35 |
| 3,786,645 | 1/1974 | Cann | 62/35 |
| 3,835,657 | 9/1974 | Scudder | 62/35 |

Primary Examiner—Ronald C. Capossela
Attorney, Agent, or Firm—Patrick F. Henry, Sr.

[57] ABSTRACT

Carbon dioxide ($CO_2$) solid discs (dry ice) are produced from liquid carbon dioxide injected into an extrusion cylinder in which the extrusion piston compresses dry snow and extrudes it through a fixed die, thereby producing pellets of dry ice which are fed by gravity into a forming cylinder chamber in which is operated a hydraulic cylinder compresses the pellets into discs. The operation is controlled by switches and hydraulic system.

14 Claims, 4 Drawing Sheets

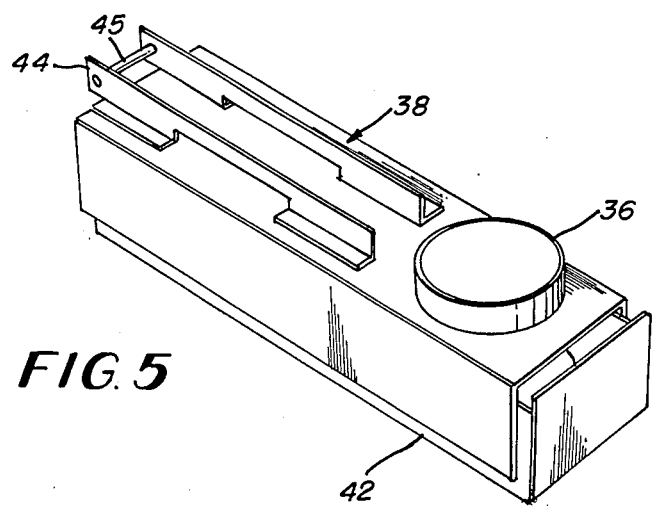
FIG. 5
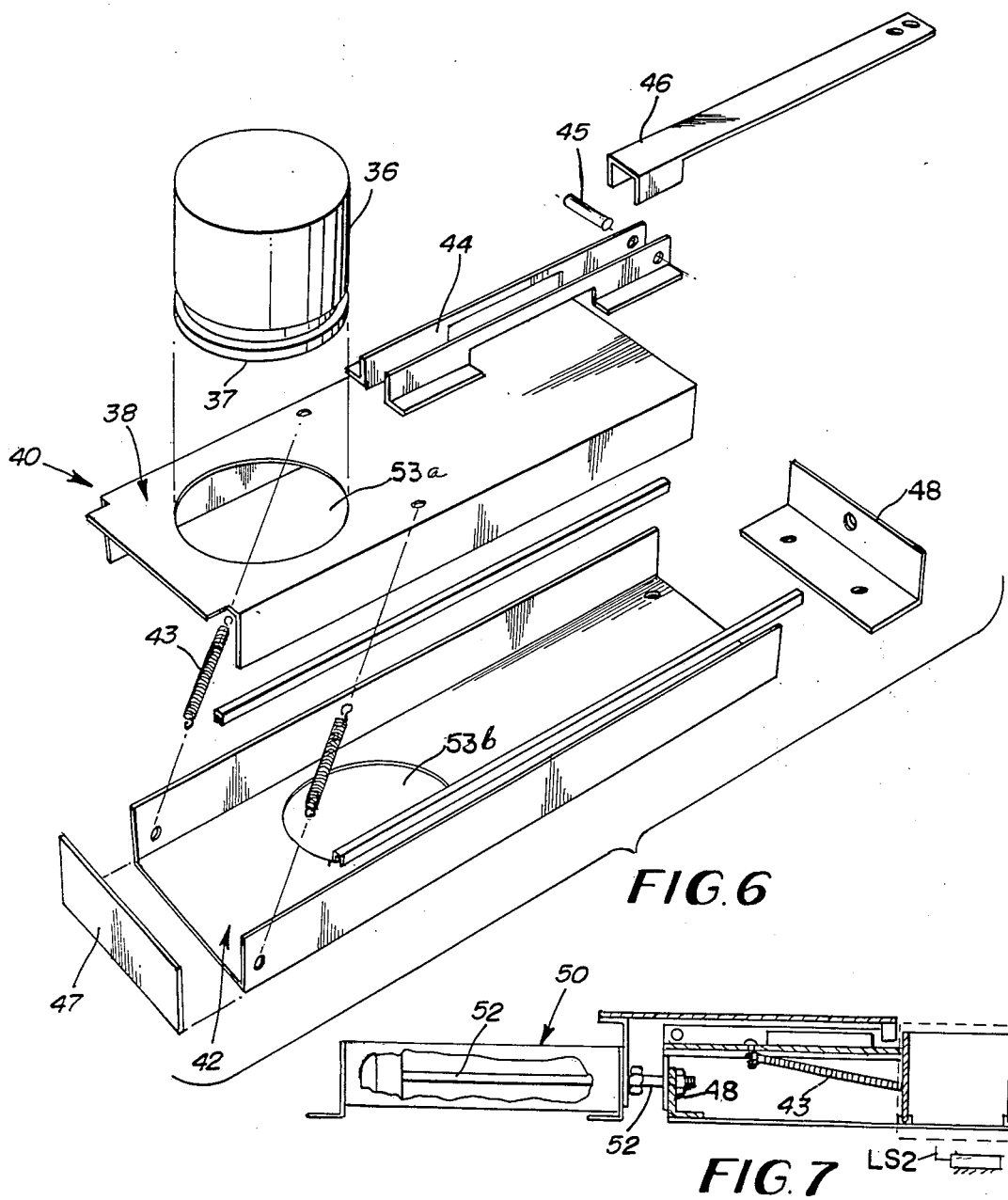
FIG. 6
FIG. 7

METHOD AND APPARATUS FOR PRODUCING CARBON DIOXIDE UNITS

An apparatus produces carbon dioxide (dry ice—$CO_2$) in disc form from a dry ice snow produced by releasing liquid carbon dioxide into a chamber and pressurizing the snow by a hydraulic piston which extrudes the snow through a die to make pellets which are dropped into a forming cylinder chamber and pressurized by a piston into discs.

Carbon dioxide expressed by its chemical symbol $CO^2$ is colorless, odorless, and tasteless; and its unique properties have enabled it to become one of the most versatile of the industrial gasses with diverse applications. In its solid form, dry ice, $CO_2$ has a temperature of minus 109.33° F. at atmospheric pressure and has a refrigeration value of 246.25 BTUs per pound. Carbon dioxide can be transported in its liquid state and stored in refrigerated storage tanks at a pressure of 300 psig and a corresponding temperature of 0° F. Exhausting liquid $CO_2$ to atmospheric pressure yields approximately one pound of dry ice in snow form and 1.1 pounds of $CO_2$ vapor. The production of dry ice in snow form is the first of a sequence of events in the making dry ice discs.

The purpose of this invention is to produce carbon dioxide dry ice in disc form to be used as a primary expandable refrigerating perishable goods in the interest of protecting the health and welfare of consumers. This equipment enables the end user of dry ice to produce its need in its own facility, thus considerably decreasing his product losses due to sublimation and dependences on suppliers.

The method comprises a continuous process from the release of carbon dioxide vapor from liquid carbon dioxide, extrusion through a die to form pellets and compression of the pellets to form discs of a unique size and shape such as 24, 8 oz. dry ice disc, 4" diameter by $\frac{5}{8}$" thickness per hour by means of completely automated controls that allow an operator to select the number of discs desired. Discs can be bagged or loose.

An object of the present apparatus is to produce discs in accordance with the procedure set forth in the preceding paragraph.

Another object of the present invention is to utilize hydraulic pressure in a continuous fashion to compress dry ice snow and pellets into disc form.

Other and further objects and advantages of the present invention will become apparent upon reading the following description of the preferred embodiment taken in conjunction with the accompanying drawings, in which:

FIG. 5 is an isometric view of the sliding tray.

FIG. 6 is an isometric disassembled assembly view of the sliding tray for transferring pellets.

FIG. 7 is a medial cross-sectional view of the sliding tray assembly.

Figure 1:
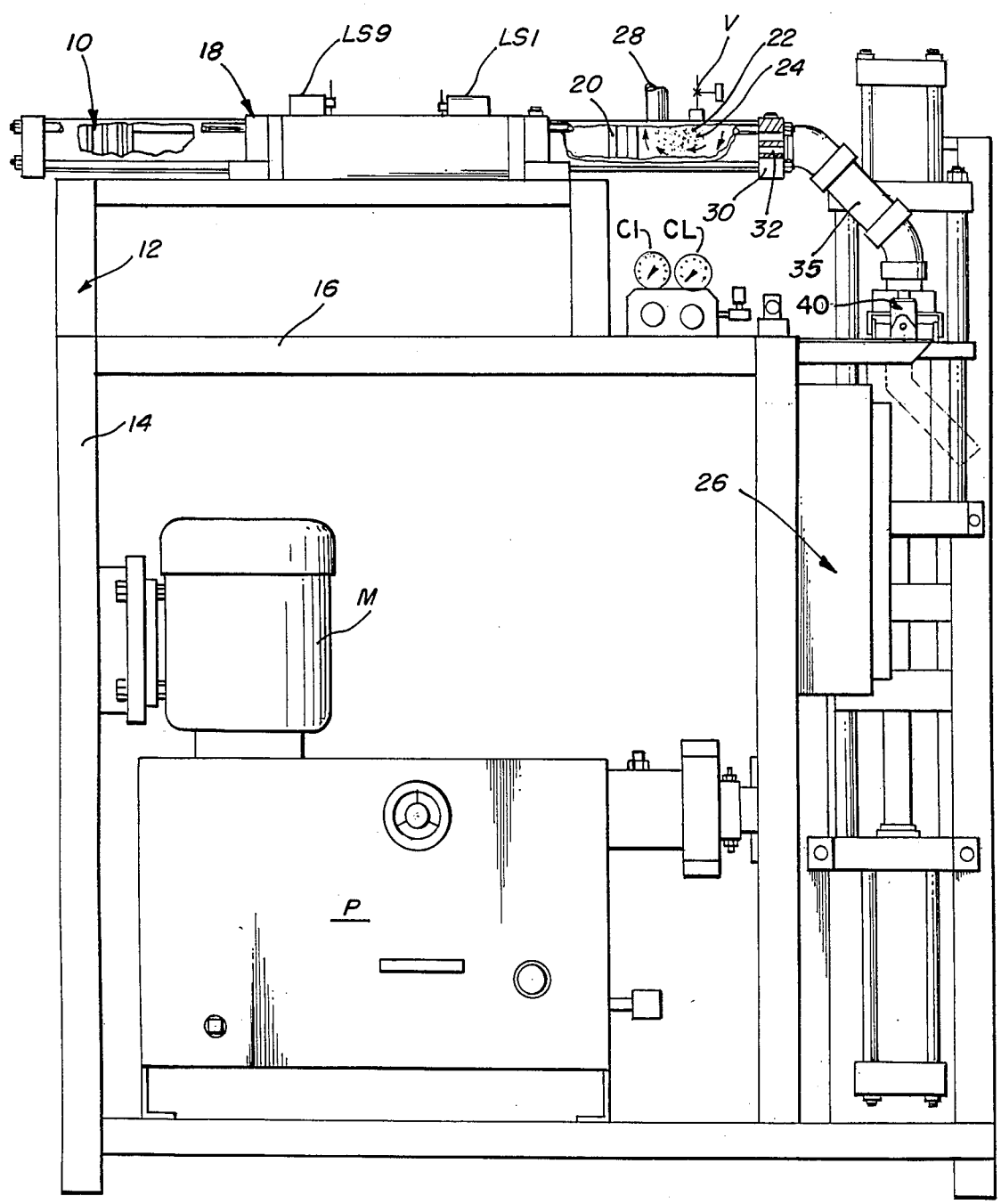
FIG. 1 is a side elevation of the apparatus.

The apparatus 10 comprises a machine frame 12 having vertical frame members 14 and horizontal frame members 16 of suitable steel connected together to form a frame support for the various components. A first hydraulic piston and cylinder assembly 18 comprises a piston 20 operating in a snow chamber 22 on dry ice snow 24 which is obtained from liquid carbon dioxide delivered from a low pressure storage tank (not shown) through a metering valve V controlled by programmable controller 26. The resultant carbon dioxide vapors are pressure exhausted through a filter screen exhaust 28 into the atmosphere or directed to a compressor (not shown) for reliquification. Upon completion of the injection process, controller 26 signals a hydraulic directional valve V 2 which extends the extrusion hydraulic cylinder 18 forward, causing the piston 20 to compress and extrude snow 24 through a fixed die 30 which is a circular, thick steel plate having cylindrical openings 32 therein through which the compacted snow is forced and extruded to form pellets 34 which are moved through a conduit 35.

Pellets 34 are collected in a fill cup 36 in an upper tray 38 of slide tray assembly 40, constructed as a sliding valve, which is supported on bracket 41.

Cup 36 has a bottom hole 37. Tray assembly 40 comprises the upper tray 38 and a lower tray 42 which is movable with respect to upper tray 38 and held in place by springs 43 extending between upper tray 38 and lower tray 42. Cup 36 is attached to upper tray 38 which supports a pin bracket 44 having a stop pin 45. A hold bar 46 is attached to the machine frame 12. A front plate 47, mounted on upper tray 38, pushes the discs 64 off the forming cylinder 54, by means of a hydraulic cylinder 50 having a piston rod 52 that is attached to lower tray 42 back plate 48. Trays 38 and 42 have respective openings 53a, 53b. Initially the entire tray assembly 40 moves with the pellets 34 in the cup 36 to a position over the forming cylinder 54 and in alignment ready to drop the pellets. However, the bottom tray blocks the pellets 34 from falling until the hole 53b in lower tray 42 aligns and matches with the hole 37 in the bottom of cup 36 and hole 53a, due to the hold bar 46 pin 45 engaging and stopping upper tray 38 but allowing lower tray 42 to continue to move until the hole 53b is in alignment with the cup 53a.

Figure 2:
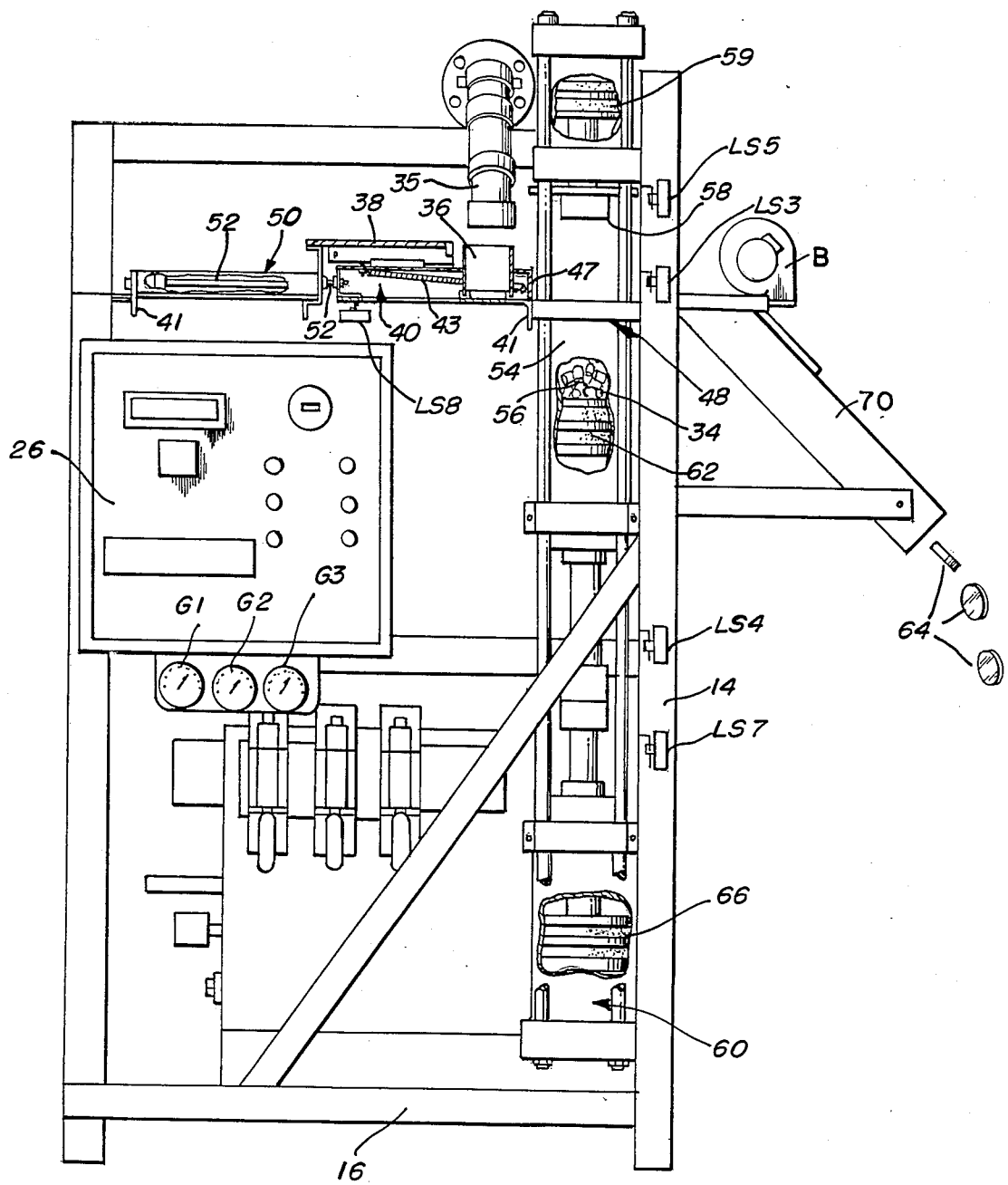
FIG. 2 is a side elevation of the right side of the apparatus shown in FIG. 1.
Figure 3:
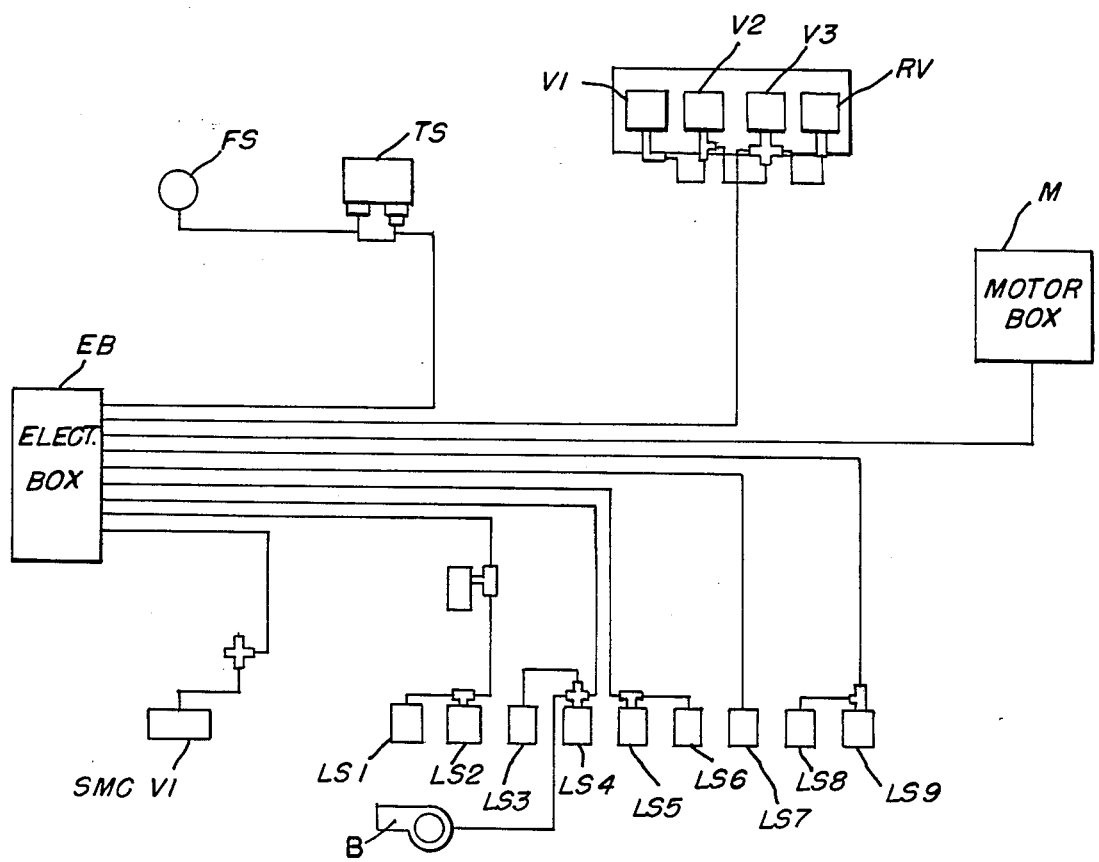
FIG. 3 is an electrical schematic diagram of the switches and other electrical components used on the machine shown in FIG. 1 and 2.

Hydraulic cylinder 50 extends the rod 52, which is attached to back plate 48 on tray 40, thereby moving the tray 40 to deposit dry ice in the pellets 34 in cup 38 through opening 53a dumping the dry ice pellets 34 into a forming cylinder 54 forming chamber which is opened and closed by a sealing plate 58. The forward motion of tray 40 is stopped by limit switch LS 2 signal to controller 26 and is subsequently returned to its original position shown in FIG. 2.

Sealing plate 58 is lowered into position by means of hydraulic piston 59 closing the open end of the forming cylinder 54 in response to an electrical signal from the controller 26 activating an hydraulic directional valve V 3. A limit switch LS 3 stops the lowering of the sealing plate 58 at a pre-set distance from the end of the forming cylinder 54. With the sealing plate 58 in position above the forming cylinder 54 the hydraulically operated cylinder 60 causes a forming piston 62 to rise, thereby compressing a deposit of dry ice pellets 34 into the form of a disc 64. Limit switch LS 4 controls the extent of rise which the forming piston 62 is allowed to travel, thereby fixing the thickness of the dry ice disc 64 produced. Once limit switch LS 3 is tripped, the controller 26 sends a signal to the hydraulic directional valve V 4 which controls the sealing plate 58 thereby causing it to rise to its original position which is governed by the position of a limit switch LS 5. Once the sealing plate 58 limit switch LS 5 is tripped, the controller 26 sends a signal to the hydraulic directional valve V 5 that controls a forming piston hydraulic cylinder 60 thereby causing it to rise to a point where the top of the forming piston 62 is flush with the open end of the forming cylinder 54. This upward motion of the forming piston 62 is controlled by a limit switch LS 6 that signals controller 26 to stop the upward motion. The system then repeats itself automatically and the subsequent forward motion of the slide tray 40 ejects the previously formed disc 64 and deposits a new quantity of dry ice pellets 34 for repeat process. Disc 64 slide down chute 70 on which is mounted the blower B.

A limit switch LS 1 is tripped sending a signal to the controller 26 that stops the forward motion of the extrusion hydraulic cylinder 28 for subsequent fill of dry ice snow 24. The extrusion process yields a fixed quantity of dry ice pellets 34 by means of a die 30, mentioned previously, which are delivered by gravity through a conduit or transferred to an deposited into a receiving cup 38.

Figure 4:
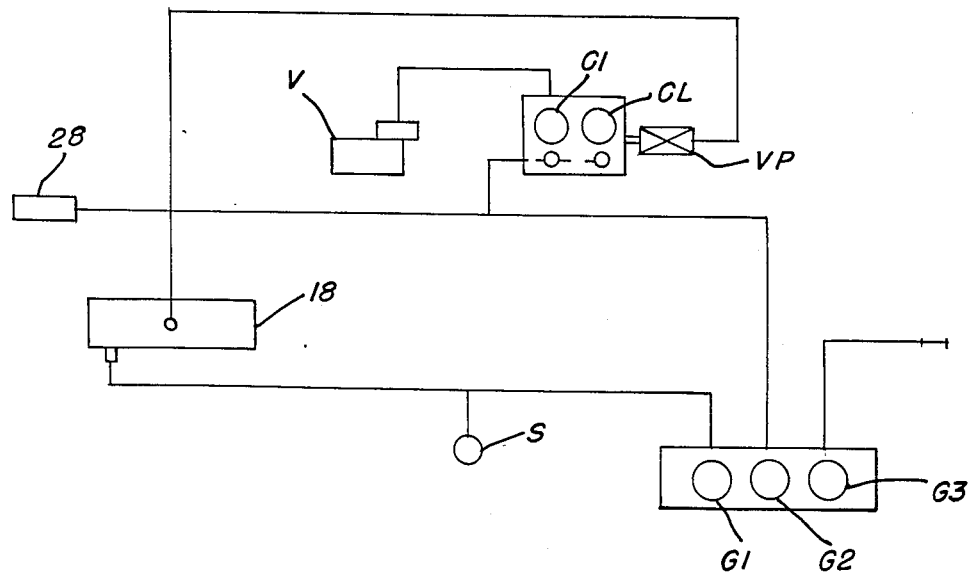
FIG. 4 is a vapor schematic diagram.

A summary of the components and operation of the electrical schematic diagram in FIG. 4 is as follows:

| COMPONENT | OPERATION SUMMARY |
| --- | --- |
| LS 1 | LS 1 stops the forward motion of the extrusion cylinder 8 |
| LS 2 | LS 2 stops forward motion of slide tray 40 |
| LS 3 | LS 3 stops the lowering motion of the cylinder plate 58 |
| LS 4 | LS 4 stops the forming piston 62 at the preset distance |
| LS 5 | LS 5 stops the upward motion of the ceiling plate 58. |
| LS 6 | LS 6 allows the forming piston 62 to push the disc 64 up over the open end of the forming cylinder 54 |
| LS 7 | LS 7 stops the forming piston 62 from its downward motion |
| LS 8 | LS 8 stops backward motion of slide tray 40 |
| LS 9 | LS 9 stops the backward motion of the extrusion cylinder |
| SMC V 1 | 4 way air valve which is used to move the slide tray 40 forward and backward |
| V 1 | Extrusion cylinder 18 hydraulic valve |
| V 2 | Extrusion cylinder 18 hydraulic valve |
| B 1 | blower |
| Valve V 3 | Sealing plate 58 hydraulic valve |
| RV (relief valve) | bypass hydraulic oil to tank |
| TS (temperature switch) | shuts machine off if oil temperature too low |
| FS (float switch) | shuts machine off if oil is too low |
| B (blower) | keeps bags which discs fall into blown open. |

In the vapor schematic of FIG. 4 there is shown the cylinder assembly 18, $CO_2$ vapor connection valve and $CO_2$ injection metering valve V, throttling valve purge VP, pressure switch S, relief valve port on valve V, and gauge-G 1 for the extrusion cylinder 18, -G 2 for the storage tank (not shown) and G 3 for the hydraulic pressure. Controls C 1 and C 2 permit settings such as 80 to 100 PSI for C 1 and 30 to 40 PSI for $CO_2$.

An electric motor M operaters an hydraulic pump arrangement P which supplies pressurized fluid to operate the various hydraulic cylinders 10, 50, 59, 60.

While there is shown and described a particular embodiment for purposes of illustration, there are various changes which may be made in the embodiment shown without departing from the scope of the invention which is defined by a proper interpretation of the appended claims.

What is claimed:

1. In an apparatus for making solid carbon dioxide units from smaller, solid carbon dioxide particles, the improvement comprising:
    a particle chamber for receiving liquid carbon dioxide,
    means for producing solid carbon dioxide particles in said particle chamber and repeatedly releasing the same,
    a unit chamber with hydraulic means,
    means for supplying a pre-determined amount of said solid carbon dioxide particles into said unit chamber for forming solid carbon dioxide units therein,
    a hydraulic motor for operating the hydraulic means,
    a power means for driving said hydraulic motor,
    electrical means for controlling the operation of the apparatus and including limit switches and electrically controlled valves.

2. The apparatus in claim 1 including: means for forming larger pellets from said carbon dioxide particles,
    means for collecting said pellets,
    and pressure means for forming said collected pellets into the larger solid carbon dioxide units.

3. The apparatus in claim 2 wherein said means for collecting comprises a movable tray into which pellets are delivered, and a chamber receiving the pellets therein from said tray.

4. The apparatus in claim 3, said tray having relatively movable first and second portions and there being a container moveable with said first portion, and a dispensing opening in said container and said trays through which pellets are dispensed into said chamber.

5. The apparatus in claim 4, wherein said tray has springs between said first and second portions, and stop means on said tray to control said relatively moveable first and second portions so as to align said container with said chamber.

6. The apparatus in claim 2 wherein said means for supplying comprises a moveable tray having holes therein, and means for moving said tray to align said holes to dump said pellets into said chamber.

7. The apparatus claimed in claim 1 wherein said apparatus includes a die through which the particles are pressurized to form pellets.

8. The apparatus in claim 7 wherein said means for pressurizing comprises a hydraulic piston operating in said particle chamber.

9. The apparatus claimed in claim 7, including a conduit leading from said die and receiving the pellets therefrom, said conduit being in communication with said disc forming chamber to continuously deposit pellets therein.

10. The apparatus in claim 1 wherein said chamber is a forming chamber into which said pellets are continuously delivered, and said pressure means selectively operable in said forming chamber continuously to form said pellets into units.

11. In a method of repeatedly making larger solid dry ice units, such as discs, from small increments of solid dry ice repeatedly obtained from particles produced by liquid carbon dioxide:
    repeatedly introducing carbon dioxide liquid forming small particles of solid carbon dioxide, repeatedly forming said small particles into larger pellets, and repeatedly forming the larger pellets into larger solid units.

12. The method claimed in claim 11 comprising extruding the carbon dioxide particles through an extrusion die to form the pellets.

13. The method claimed in claim 12 wherein the particles are forced through a particle chamber and through the die by means of a pressure member.

14. The method in claim 11, in which: said liquid carbon dioxide is repeatedly introduced into a chamber in which it becomes small particles and said small particles are forced repeatedly through openings to form larger pellets.

* * * * *